United States Patent
Higuchi

(10) Patent No.: US 6,844,043 B2
(45) Date of Patent: Jan. 18, 2005

(54) OPTICAL DISK USING GROOVE RECORDING SYSTEM

(75) Inventor: Takanobu Higuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/320,414

(22) Filed: Dec. 17, 2002

(65) Prior Publication Data

US 2003/0138590 A1 Jul. 24, 2003

(30) Foreign Application Priority Data

Jan. 21, 2002 (JP) ........................................ 2002-010986

(51) Int. Cl.$^7$ ................................................. B32B 3/02
(52) U.S. Cl. .................... 428/64.1; 428/64.4; 428/64.8; 430/270.14
(58) Field of Search .............................. 428/64.1, 64.4, 428/64.5, 64.6, 457, 913; 430/270.13, 495.1, 945

(56) References Cited

U.S. PATENT DOCUMENTS 4,990,388 A    2/1991 Hamada et al.

2003/0137921 A1 *  7/2003  Higuchi ................... 369/275.4
2003/0148215 A1 *  8/2003  Kakuta et al. ......... 430/270.15
2003/0203147 A1 * 10/2003  Usami et al. .............. 428/64.1

FOREIGN PATENT DOCUMENTS

JP    2002-008269    1/2002

* cited by examiner

Primary Examiner—Elizabeth Mulvaney
(74) Attorney, Agent, or Firm—Morgan, Lewis & Bockius LLP

(57) ABSTRACT

An optical disk includes a substrate, a reflection layer, an organic dye layer, a protection layer and a cover layer. When recording information on the optical disk by a laser beam, an organic dye expands due to heat generation caused by laser beam radiation. The laser beam passes through the cover layer of the optical disk during recordation. The information is recorded in grooves formed in the substrate. Hardness of a resin substrate side of the optical disk is higher than that of a cover layer side of the optical disk so as to propagate stresses generated by the thermal expansion of the organic dye toward the cover layer. The hardness relationship between the cover layer side and the substrate side should be established at least when the information is recorded on the optical disk. The optical disk can record the information more finely because deformations of the reflection layer are prevented when recording the information.

6 Claims, 2 Drawing Sheets

OPTICAL DISK USING GROOVE RECORDING SYSTEM

BACKGROUND OF THE INVENTION

1. Field of the Invention

The present invention relates to write-once type optical disks.

2. Description of the Related Art

An optical disc is one type of information recording media. Most conventional write-once optical disks such as CD-R and DVD-R have the following structure. The face of a track side (groove side) provided on a transparent resin substrate is doped with an organic dye by spin coating to form an organic dye layer over the track. A metallic reflection layer made from, for example, gold, silver, silver alloy, aluminum, or aluminum alloy is formed on the organic dye layer. Then, a protective coat (referred to as a "cover layer" hereinafter) made from, for example, an ultraviolet light cure resin is formed on the metallic reflection layer. When recording data (information) on the optical disk, a laser beam is radiated on the substrate side. The later beam decomposes the organic dye. The refractive index is changed by the decomposition of the organic dye. The laser beam also deforms the track and/or the reflection layer due to heat generation. The refractive index change, the track deformation and the reflection layer deformation in combination create so-called pits to record the information.

In recent years, a next-generation recordable optical disk system (referred to as "DVR" system) has been developed, which utilizes a violet laser as a light source for recording and reproducing information together with an objective lens having a high numerical aperture (0.85 or more). In the DVR (Digital Video Recorder) system, the cover layer of the optical disk is about 0.1 mm thick, and the laser beam is radiated on the cover layer side. The DVR system suppresses influences of optical aberration produced by use of the high numerical aperture objective lens, and increases recording density of information, thereby achieving a so-called high capacity information recording disk.

Accordingly, a write once optical disk utilized in the DVR system (referred to as "DVR-R disk" hereinafter) is different from the conventional write once optical disks such as CD-R and DVD-R disks in that the laser beam is radiated to the cover layer side. In other words, the layers are stacked on the substrate in the DVR-R disk in an inverse order, as compared with the layers in the CD-R and DVD-R disk. A method of manufacturing the DVR-R disk is also different from a method of manufacturing the CD-R and DVD-R disks in that when the cover layer is formed, a dielectric layer should be formed in order to protect the organic dye layer from a non-cured ultraviolet light curing resin. The ultraviolet light curing resin is a material which forms the cover layer.

Therefore, the production of DVR-R disks requires a choice of optimized materials and structure.

SUMMARY OF THE INVENTION

One object of the present invention is to provide optimized materials and configuration for a DVR-R disk so as to achieve a high-capacity disk by forming finer (smaller) recording marks.

According to one aspect of the present invention, there is provided an optical disk for recording information, comprising: a resin substrate having grooves on one surface of the resin substrate; a reflection layer formed over the grooves such that the reflection layer lays over the resin substrate in accordance with a shape of the grooves; an optical characteristic change material layer formed on the reflection layer such that the optical characteristic change material layer fills in depressions defined by the respective grooves and extends over protrusions between the grooves, the optical characteristic change material layer changing optical characteristics upon radiation of an optical beam; a protective layer formed over the optical characteristic change material layer, the protective layer being light transmissive; and a cover layer formed over the protective layer such that the reflection layer, the optical characteristic change material layer, and the protective layer are sealed on the resin substrate by the cover layer, the cover layer being light transmissive, wherein the resin substrate is harder than the cover layer at least when the optical beam is radiated on the optical characteristic change material layer in the depressions of the grooves. The optical disk can therefore provide fine information recording so as to realize high density recordation if information is recorded in the grooves of the optical disk.

DETAILED DESCRIPTION OF THE INVENTION

An embodiment of a DVR-R disk according to the present invention will be described with reference to the accompanying drawings.

Figure 1A:
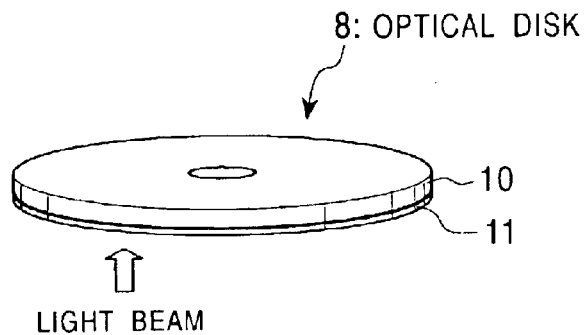
FIG. 1A schematically illustrates a perspective view of a DVR-R disk according to an embodiment of the present invention.
Figure 1B:
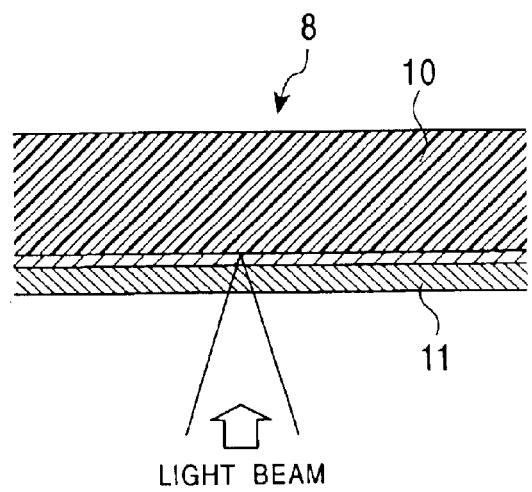
FIG. 1B is a cross sectional view of the DVR-R disk shown in FIG. 1A, taken in the radial direction of the disk.
Figure 1C:
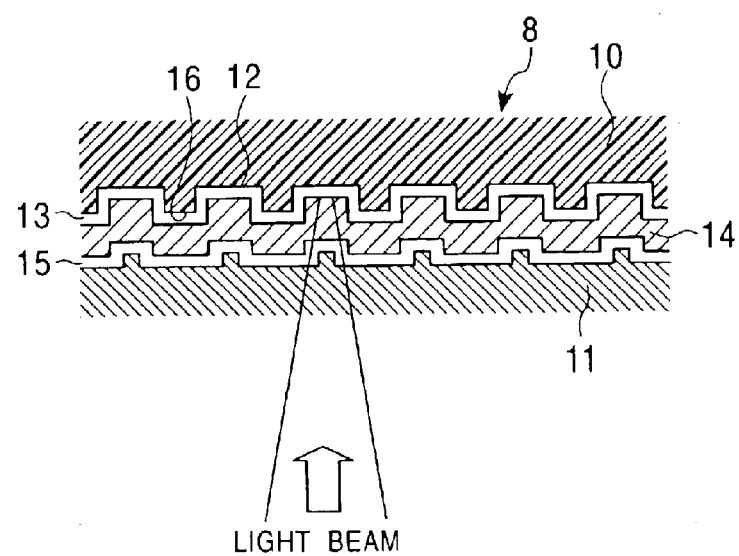
FIG. 1C is an enlarged cross sectional view of an organic dye layer and neighboring layers in the DVR-R disk shown in FIG. 1B.

Referring to FIGS. 1A, 1B and 1C, an optical disk (i.e., DVR-R disk) 8 according to this embodiment includes a resin substrate 10 made from a macromolecule material such as polycarbonate and polyolefin. The surface for information recordation of the resin substrate 10 has a plurality of grooves 12 to form information tracks.

In the present embodiment, the grooves 12 wobble to receive address information of data recorded on the optical disk 8. That is, information is recorded on an information recording layer which is formed in the wobbling grooves 12. In this specification, this recording method is referred to as "in-groove recording" or "groove recording".

As shown in FIG. 1C, a reflection layer 13 is formed over the grooves 12 of the substrate 10. The reflection layer 13 is made from aluminum, silver, or alloy metals based on aluminum and/or silver because the reflection layer 13 has to be thin and have high reflectance. The reflection layer 13 covers the grooves 12 which are in a concave-convex shape.

An organic dye is applied over the reflection layer 13 by spin coating, thereby forming an organic dye layer 14. Since groove recording is utilized in this embodiment, the organic dye layer 14 is formed to completely fill depressions of the grooves 12 as shown in FIG. 1C.

A protection layer 15 is formed over the organic dye layer 14, and a cover layer 11 is formed over the protection layer 15. The protection layer 15 is a dielectric film to protect the organic dye from an ultraviolet ray curing resin of the cover layer 11. Since the protective layer 15 needs to be highly transparent and should protect the organic dye layer, the protective layer 15 is made from a metal oxide such as SiOx and AlOx or a metal nitride such as SiNx and AlNx.

The cover layer 11 is made from a macromolecular resin such as polycarbonate. The cover layer 11 should be light transmissive since a laser beam passes through the cover layer 11 to record information on the disk 8.

In this embodiment, if the hardness of the substrate side layers (the substrate 10+ the reflection layer 13) is represented by Ha, and the hardness of the cover layer side layers (the cover layer 11+ the protective layer 15) is represented by Hb, the following relationship is established:

$$Ha > Hb$$

Here, the "hardness" means an indentation deformation. For instance, the hardness is Brinell hardness (JIS-Z2243), Vickers hardness (JIS-Z2244), Rockwell hardness (JIS-Z2245), or pencil hardness (JIS-K5400). As will be described later, deformations caused by an expansion of the organic dye layer 14 upon laser beam radiation result in an indentation in the layers in contact with the organic dye layer 14.

It should be noted that the relationship between the hardness Ha and Hb of the layers in the disk 8 is not limited to the above mentioned relationship (Ha>Hb). The radiation of the laser beam for information recordation elevates the temperature of the organic dye layer 14, and the elevated temperature changes the refractive index of the organic dye layer 14. Before the refractive index of the organic dye layer 14 changes (i.e., before the temperature reaches a certain value T at which the volume of the dye expands non-linearly, such as the temperature of thermal decomposition, melting point, and sublimation temperature of the dye), the hardness Ha and Hb may have the following relationship:

$$Ha \leq Hb$$

although the following relationship should be established after the refractive index changes, i.e., after the temperature reaches the value T:

$$Ha > Hb$$

In the indentation hardness test, the surface of the test object (up to several tens nm in depth) can be ignored. Accordingly, in this embodiment, the reflection layer 13 (about 20 nm thick) formed on the resin substrate 10 and the protective layer 15 (about 5 nm thick) formed on the cover layer 11 can be ignored. Therefore, it can be considered that the hardness Ha represents the hardness of the substrate itself and the hardness Hb represents the hardness of the cover layer itself.

A process of fabricating the DVR-R disk 8 will now be described. It should be noted that the present invention is not limited to the fabrication process described below. Particular materials, sizes, ratios and values mentioned below are mere examples.

Grooves (tracks) are first formed on a master disk by utilizing an electron beam recorder and an electron beam resist to prepare a grooved master disk (resist original). A nickel stamper is then produced from the master disk by electroforming.

The nickel stamper is utilized to produce a resin substrate 10 from polycarbonate resin by an injection molding method. The resin substrate 10 is about 120 mm in diameter and about 1.1 mm in thickness. The grooves 12 on the substrate surface is 80 nm deep and a track pitch is 320 nm. The spacing between the grooves 12, i.e., the width of the protrusion 16 between the grooves 12, is 130 nm and a wall angle of the groove is about 90 degrees.

A reflection layer 13 made from an aluminum-titanium alloy (Al:Ti=99:1) is formed over the grooves 12 of the resin substrate 10. The reflection layer 13 is created by sputtering such that the reflection layer 13 has a thickness of about 20 nm.

After that, the reflection layer 13 is coated with an organic dye by spin coating such that the reflection layer 13 has a thickness of about 70 nm in the groove 12 and a thickness of about 35 nm on the protrusion 16 between the grooves 12. On the organic dye layer 14, a protective layer 15 is formed with silicon dioxide ($SiO_2$) by sputtering such that the protective layer 15 has a thickness of 5 nm.

Then, a polycarbonate film having about 0.095 mm thickness is fixed on the protective layer 15 by utilizing a UV curing adhesive.

The DVR-R disk 8 produced by the above described process was tested by the pencil test. Hardness at the resin substrate side was HB, and hardness at the cover layer side was 2B.

Figure 2A:
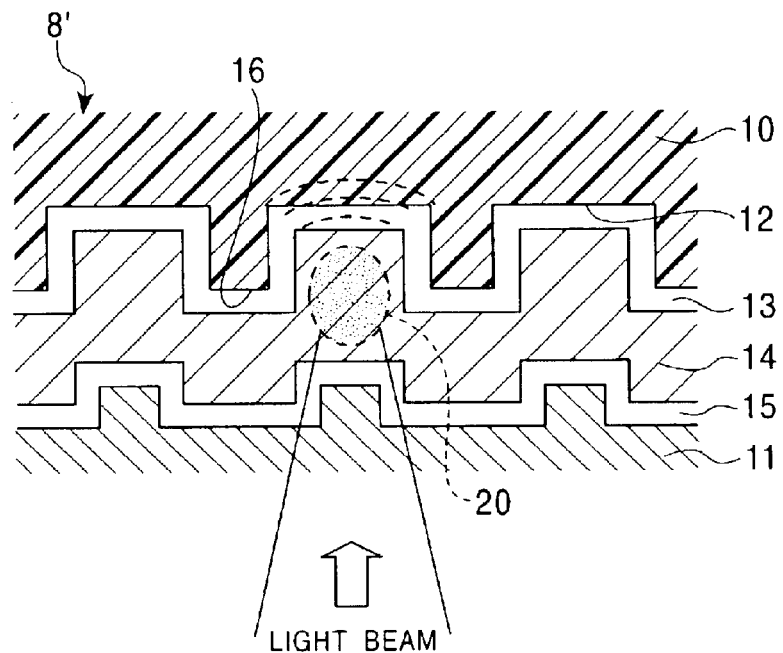
FIG. 2A is a cross sectional view of an optical disk to illustrate deformations occurring in the optical disk when recording information, if a substrate (side) is softer than a cover layer (side).
Figure 2B:
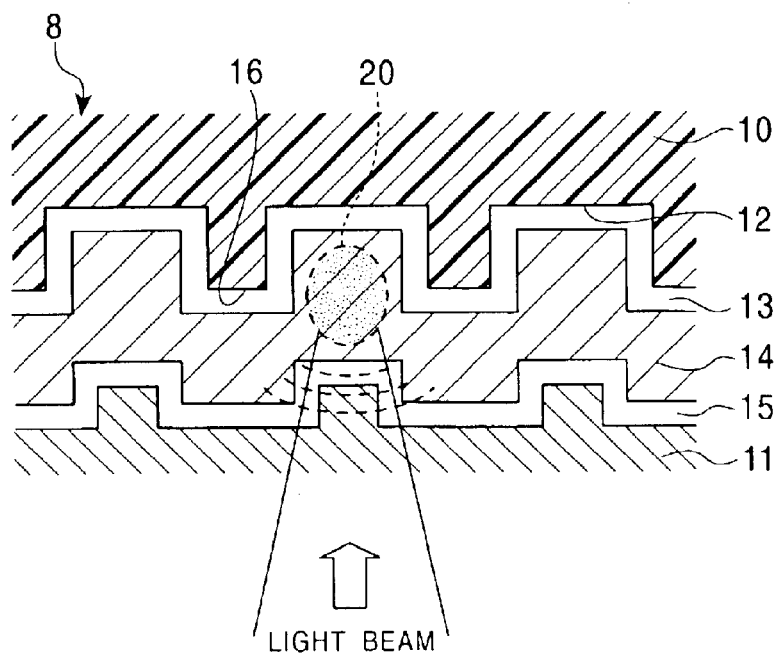
FIG. 2B is a cross sectional view of an optical disk of the embodiment to illustrate deformations occurring in the optical disk, if the substrate (side) is harder than the cover layer (side).

Recordation characteristics of the DVR-R disk 8 produced by such a process and a DVR-R disk 8' produced by a different process will be described with reference to cross sectional views of the DVR-R disk (FIGS. 2A and 2B).

A laser beam is radiated to the cover layer side of the disk 8 (8') when recording information on the disk 8 (8'). The laser beam passes through the cover layer 11 and the protective layer 15 and focuses in the groove 12 thereby creating a beam spot 20 in the organic dye layer 14. The organic dye in the beam spot 20 is thermally decomposed by the laser beam, and the refractive index of that portion of the organic dye changes. This change of the refractive index is irreversible, and the refractive index is never restored even after the temperature of the beam spot 20 returns to a normal temperature upon completion of the laser beam radiation. In this manner, information is recorded in the organic dye layer 14 inside depressions of the groove 12. Recordation marks are therefore created in the groove 12 by the beam spot 20.

The thermal decomposition of the organic dye produces a stress in the organic dye layer 14 in the vicinity of the beam spot 20 because the volume of the organic dye expands. Accordingly, if the resin substrate side is softer than the cover layer side, as shown in FIG. 2A, a distortion resulting from the stress propagates toward the reflection layer 13 and the resin substrate 10 as indicated by the imaginary wavy lines. The distortion of the reflection layer 13 causes a problem when the information recorded on the track is retrieved.

When retrieving the information recorded on the DVR-R disk 8', reflection of the laser beam from the reflection layer 13 is utilized. Accordingly, if the reflection layer 13 has a distortion, a large distortion is included in the retrieved information (or played back signals). Especially, since the DVR-R disk 8' has smaller recordation marks and a narrower track pitch than DVD-R disks and CD-R disks in order to record more information (to increase a recording density or capacity), the distortion in the reflection layer is apt to adversely affect the retrieval of the signals and cause crosstalk. The crosstalk is interference between adjacent information tracks.

Unlike the DVR-R disk 8', the DVR-R disk 8 of this embodiment (FIG. 2B) has a configuration that the resin substrate side is always harder than the cover layer side, or the resin substrate side becomes harder than the cover layer side when the refractive index of the organic dye layer 14 changes upon the laser beam radiation. As shown in FIG. 2B, therefore, the distortion resulting from the stress caused upon the volume expansion of the organic dye in and around the beam spot 20 extends toward the cover layer side, as indicated by the imaginary wavy lines. The protective layer 15 and the cover layer 11 deform, but the resin substrate side does not deform. Since the deformation of the substrate side is prevented, the deformation of the reflection layer 13 is prevented. As mentioned above, the deformation of the reflection layer 13 greatly degrades the recorded information retrieval. The crosstalk is also prevented because the reflection layer 13 does not deform.

It is possible to set the difference between the refractive index of the organic dye layer 14 and that of the cover layer side (combination of the cover layer and protection layer) to be very small (e.g. about 0.1 to 1.0) if materials for the organic dye layer 14, cover layer 11 and protection layer 15 are determined appropriately. If the refractive index difference is made small, reflection from the interface between the protective layer 15 and the cover layer 11 can be ignored even if the stress causes deformation on the cover layer side as shown in FIG. 2B. Since the protective layer 15 and the cover layer 11 are transparent, qualities of the retrieved information are not adversely affected even if distortions exist in the protective layer 15 and the cover layer 11.

It is necessary to take into account a fact that heat generation of the organic dye by the laser beam radiation for information recording may interfere with adjacent information recording tracks. This is crosswrite. However, because the groove recording scheme is utilized in this embodiment, the organic dye layer which records the information is surrounded by the metallic reflection layer 13 having high thermal conductivity, as shown in FIG. 2B. Accordingly, the heat generated in the organic dye layer 14 upon the laser beam radiation is immediately absorbed by the metallic reflection layer 13. Thus, the generated heat does not interfere with the adjacent information recording tracks.

This application is based on a Japanese patent application No.2002-10986 and the entire disclosure thereof is incorporated herein by reference.

What is claimed is:
1. An optical disk for recording information, comprising:
   a resin substrate having grooves on one surface of the resin substrate;
   a reflection layer formed over the grooves such that the reflection layer lays over the resin substrate in accordance with a shape of the grooves;
   an optical characteristic change material layer formed on the reflection layer such that the optical characteristic change material layer fills in depressions defined by the respective grooves and extends over protrusions between the grooves, the optical characteristic change material layer changing optical characteristics when a light beam is radiated thereon;
   a protective layer formed over the optical characteristic change material layer, the protective layer being light transmissive; and
   a cover layer formed over the protective layer such that the reflection layer, the optical characteristic change material layer, and the protective layer are sealed on the resin substrate by the cover layer, the cover layer being light transmissive, wherein the resin substrate is harder than the cover layer at least when the optical beam is radiated on the optical characteristic change material layer in the depressions of the grooves.

2. The optical disk according to claim 1, wherein the information is recorded on the optical characteristic change material layer in the depressions of the grooves when the light beam is radiated on the cover layer side.

3. The optical disk according to claim 1, wherein the optical characteristic change material layer is made from an organic dye material which changes a refractive index when a light beam is radiated thereon.

4. The optical disk according to claim 1, wherein the optical disk is a DVR-R disk.

5. The optical disk according to claim 1, wherein the substrate is about 1.1 mm in thickness and the cover layer is about 0.1 mm in thickness.

6. The optical disk according to claim 3, wherein the hardness of the substrate is greater than the hardness of the cover layer after the refractive index of the optical characteristic change material layer has changed.

* * * * *